United States Patent
Brenner et al.

(10) Patent No.: US 12,456,895 B2
(45) Date of Patent: Oct. 28, 2025

(54) RETAINING SYSTEM WITH BASIC ELEMENT AND FIXING ELEMENTS TO FIX A BUS BAR ON STATOR OR STATOR SEGMENT OF DYNAMOELECTRIC MACHINE

(71) Applicant: Flender GmbH, Bocholt (DE)

(72) Inventors: Robin Brenner, Kirchham (DE); Artur Deutsch, Bad Griesbach i. Rottal (DE); Norbert Schönbauer, Bad Füssing (DE); Michael Weger, Kösslarn (DE); Attila Koeszegi, Kanjiza (RS); Andreas Lindmeier, Ruhstorf (DE); Dominik Ratzisberger, Kösslarn (DE); Franz Xaver Michael Schober, Neukirchen vorm Wald (DE)

(73) Assignee: Flender GmbH, Bocholt (DE)

( * ) Notice: Subject to any disclaimer, the term of this patent is extended or adjusted under 35 U.S.C. 154(b) by 222 days.

(21) Appl. No.: 17/917,176

(22) PCT Filed: Feb. 9, 2021

(86) PCT No.: PCT/EP2021/053019
§ 371 (c)(1),
(2) Date: Oct. 5, 2022

(87) PCT Pub. No.: WO2021/204437
PCT Pub. Date: Oct. 14, 2021

(65) Prior Publication Data
US 2023/0163655 A1    May 25, 2023

(30) Foreign Application Priority Data

Apr. 6, 2020    (EP) .................................... 20168159

(51) Int. Cl.
*H02K 3/50*    (2006.01)
*H02K 7/18*    (2006.01)

(52) U.S. Cl.
CPC ............. *H02K 3/505* (2013.01); *H02K 7/183* (2013.01); *H02K 2203/09* (2013.01)

(58) Field of Classification Search
CPC ............ H02K 3/50; H02K 3/505; H02K 3/52; H02K 3/521; H02K 3/522; H02K 3/524;
(Continued)

(56) References Cited

U.S. PATENT DOCUMENTS 3,089,048 A * 5/1963 Bahn ...................... H02K 3/505
                                                              310/260
3,344,297 A * 9/1967 Bishop ................... H02K 3/505
                                                              310/260

(Continued)

FOREIGN PATENT DOCUMENTS

CA    2409794 A1 * 4/2003 ............. H02K 3/522
CN    106253538    12/2016
(Continued)

OTHER PUBLICATIONS

Air Gap Magnetic Wikipedia.*
(Continued)

*Primary Examiner* — Maged M Almawri
(74) *Attorney, Agent, or Firm* — Henry M. Feiereisen LLC

(57) ABSTRACT

A retaining system for bus bars includes a basic element for fastening to an end face of a stator or stator segment of a dynamoelectric machine, and a predefined number of fixing elements configured to fix the bus bars to the basic element, wherein, when assembled, the retaining system has openings to suppress eddy currents when the bus bars are energized.

10 Claims, 4 Drawing Sheets

(58) Field of Classification Search
CPC ...... H02K 3/525; H02K 3/46; H02K 2203/09; H02K 2203/06; H02K 3/28; H02K 3/18; H02K 1/146; H02K 1/2706
USPC .......................................... 310/71, 180–208
See application file for complete search history.

(56) References Cited

U.S. PATENT DOCUMENTS

| | | | | |
|---|---|---|---|---|
| 3,348,085 | A * | 10/1967 | Coggeshall | H02K 3/505 |
| | | | | 310/260 |
| 3,437,859 | A * | 4/1969 | Coggeshall | H02K 3/505 |
| | | | | 310/260 |
| 3,691,416 | A * | 9/1972 | Drexler | H02K 3/505 |
| | | | | 310/260 |
| RE28,478 | E * | 7/1975 | Bahn | H02K 3/505 |
| | | | | 310/260 |
| 3,974,409 | A * | 8/1976 | Loy | H02K 3/505 |
| | | | | 310/260 |
| 4,321,497 | A | 3/1982 | Long | |
| 5,693,996 | A * | 12/1997 | Neidhofer | H02K 3/505 |
| | | | | 310/260 |
| 7,400,072 | B2 * | 7/2008 | Ward | H02K 3/505 |
| | | | | 439/798 |
| 10,250,096 | B2 * | 4/2019 | Nishikawa | H02K 3/50 |
| 10,298,083 | B2 * | 5/2019 | Okamoto | H02K 3/522 |
| 10,536,046 | B2 * | 1/2020 | Teranishi | H02K 3/522 |
| 10,944,304 | B2 * | 3/2021 | Kim | H02K 3/522 |
| 2003/0090166 | A1 * | 5/2003 | Kobayashi | H02K 3/522 |
| | | | | 310/144 |
| 2003/0094879 | A1 * | 5/2003 | Kobayashi | H02K 15/0062 |
| | | | | 310/238 |
| 2012/0293024 | A1 * | 11/2012 | Yokogawa | H02K 3/522 |
| | | | | 310/43 |
| 2012/0319512 | A1 * | 12/2012 | Nakagawa | H02K 1/278 |
| | | | | 310/71 |
| 2014/0183993 | A1 * | 7/2014 | Takasaki | H02K 15/0062 |
| | | | | 310/71 |
| 2016/0190887 | A1 * | 6/2016 | Sambuichi | H02K 15/0068 |
| | | | | 310/71 |
| 2016/0218578 | A1 * | 7/2016 | Yamada | H02K 3/522 |
| 2017/0353080 | A1 * | 12/2017 | Thygesen | H02K 1/2791 |
| 2018/0316239 | A1 * | 11/2018 | Ogawa | H02K 3/522 |
| 2019/0356190 | A1 * | 11/2019 | Kitta | H02K 1/148 |
| 2023/0163491 | A1 * | 5/2023 | Kitagawa | H01R 9/2425 |
| | | | | 439/709 |
| 2023/0396117 | A1 * | 12/2023 | Hong | F04C 15/00 |

FOREIGN PATENT DOCUMENTS

| | | | | |
|---|---|---|---|---|
| DE | 1 200 932 | | 9/1965 | |
| DE | 21 61 139 | | 6/1973 | |
| EP | 0 375 419 | | 6/1990 | |
| EP | 2899853 | A1 * | 7/2015 | .............. H02K 3/50 |
| WO | WO-2014129288 | A1 * | 8/2014 | ......... H02K 15/0056 |
| WO | WO 2019/185224 | | 10/2019 | |

OTHER PUBLICATIONS

WO2022154571A1 English Translation.*
International Search Report Issued by the European Patent Office on Mar. 29, 2021 in International Application PCT/EP2021/053019.

* cited by examiner

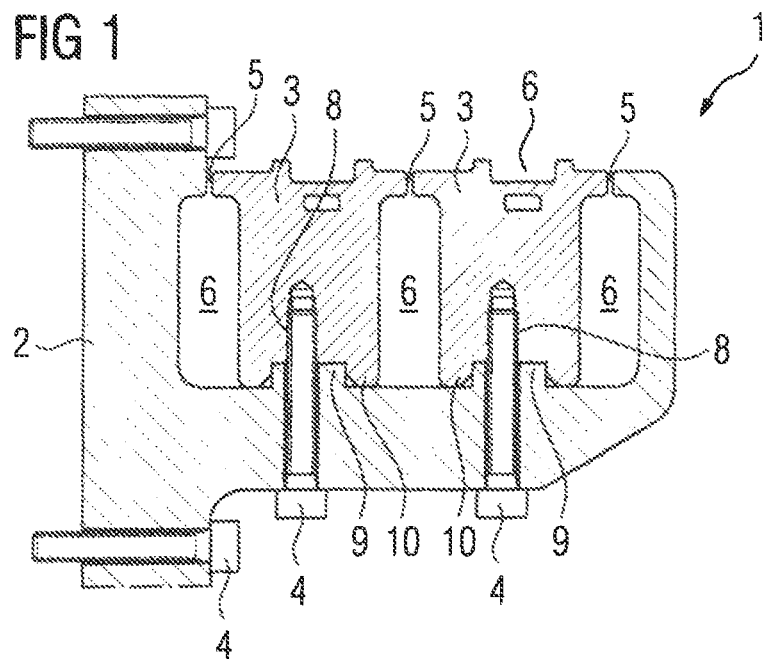
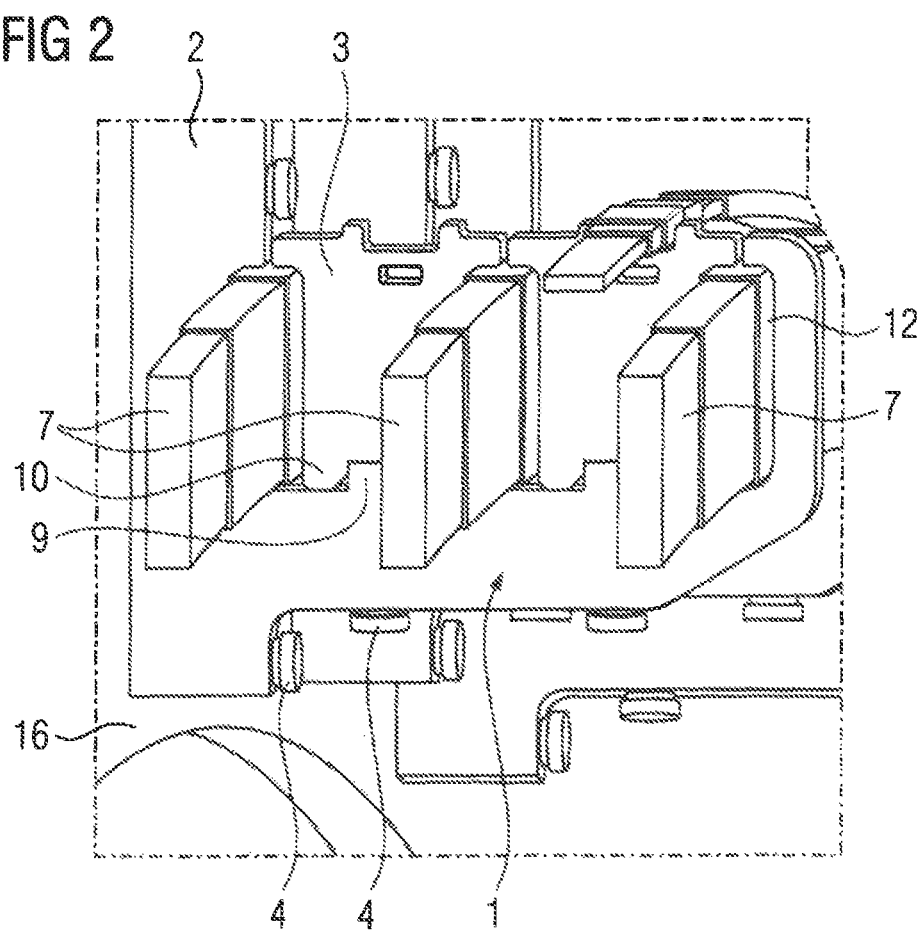

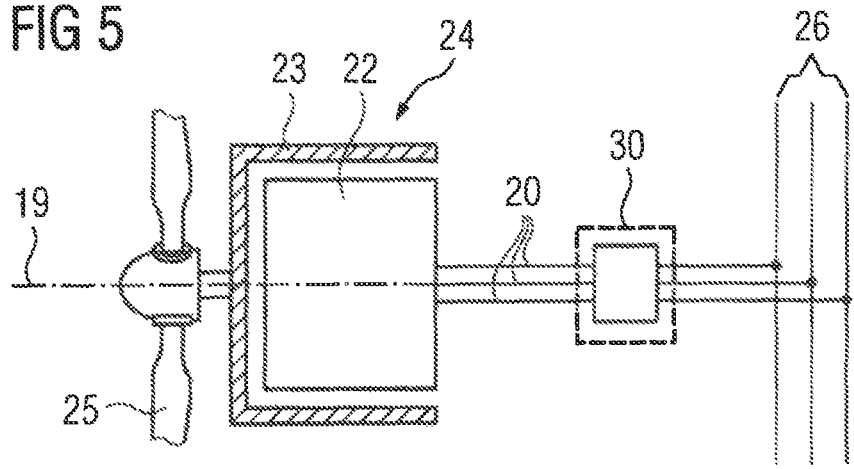
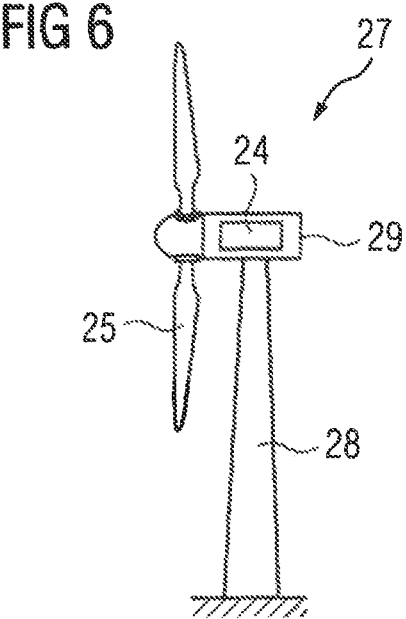

RETAINING SYSTEM WITH BASIC ELEMENT AND FIXING ELEMENTS TO FIX A BUS BAR ON STATOR OR STATOR SEGMENT OF DYNAMOELECTRIC MACHINE

CROSS-REFERENCES TO RELATED APPLICATIONS

This application is the U.S. National Stage of International Application No. PCT/EP2021/053019, filed Feb. 9, 2021, which designated the United States and has been published as International Publication No. WO 2021/204437 A1 and which claims the priority of European Patent Application, Serial No. 20168159.0, filed Apr. 6, 2020, pursuant to 35 U.S.C. 119 (a)-(d).

BACKGROUND OF THE INVENTION

The invention relates to a retaining system for bus bars on stators, or stator segments, of dynamoelectric machines, in particular wind power generators, as well as to such a stator of a dynamoelectric machine and to a wind power plant.

Cons, in particular of larger dynamoelectric machines, are electrically combined in coil groups or coil systems. This usually required bus bars, which at increased dead weight can no longer be attached directly to the winding heads. In the case of wind power plants, especially in the case of directly driven wind power generators, it is common to use massy bus bars, which further increase the dead weight problem.

Such bus bars of a directly driven wind power generator, which is constructed in a segmented manner, are known, for example, from WO 2019/185224 A1.

Proceeding from this, the invention is based on the object of creating a retaining system that is suitable for bus bars of a dynamoelectric machine, in particular for a directly driven generator of a wind power plant. Primarily in this case, the required dielectric strength/electrical clearances of these bus bars within this retaining system are to be maintained, and there are to be adequate provisions for cooling the bus bars and the dynamoelectric machine. Furthermore, the retaining system is to be integrated into the structure of the dynamoelectric machine as far as possible in order to provide a compact generator in a nacelle of a wind power plant.

The stated object is achieved by a retaining system for bus bars, comprising the following elements: a basic element that can be fastened to an end face of a stator or stator segment of a dynamoelectric machine, and a predefined number of fixing elements by means of which the bus bars can be fixed to the basic element.

SUMMARY OF THE INVENTION

The stated object is also achieved by a stator, or stator segment, of a dynamoelectric machine,
  wherein in substantially axially extending grooves of a laminated core, there is provided a winding system that forms winding overhangs at the end faces,
  wherein the laminated core is arranged on a support system which, in the region of the end face, has pressure plates that are fixed by means of connection elements,
  wherein a retaining system for bus bars as claimed in claim 1 is provided, which can be fastened with a basic element to an end face of a stator or stator segment of the dynamoelectric machine, and bus bars can be fixed to the basic element by means of a predefined number of fixing elements.

The stated object is also achieved by a generator of a wind power plant comprising a stator or stator segment.

The stated object is also be achieved by a wind power plant comprising a generator.

The retaining system according to the invention, which in particular is realized in steel, enables loadable drilled holes that are relevant for fastening to be made directly in the basic elements and fixing elements, Additional fixing components can therefore be omitted, and the amount of assembly work is thus simplified considerably. This increases the rigidity of the retaining system, in particular of its components such as the basic element and fixing elements, such that all of the termination surfaces for bus bars are less prone to vibration.

The layout of the bus bars at the end face of the stator, or stator segment, can thus also be optimized in respect of the required electrical distances, such that an optimized implementation of the dimensions of the retaining system benefits the ventilation of the winding overhang of the stator.

The arrangement of the bus bars constitutes the respective supply line to a phase of a coil group of the winding system of the dynamoelectric machine, in particular of the generator.

Electrical contacting of the bus bars in the circumferential direction may be effected by plugging together, welding, stranded wire connections.

In order obtain a further reduction in the weight of the bus bars, their cross-section can be reduced, starting from the infeed point.

Data lines can also be easily laid on the retaining system, by fastening them to the retaining system by means of cable ties.

The retaining system with its bus bars, neutral point connections, earthing lines and data lines is arranged substantially radially beneath the winding overhang of a stator segment or of the stator. This results in a more compact design. This design also allows the bus bars to be integrated into any cooling arrangement of the winding heads.

The stator segment, with function-ready winding system, pre-assembled bus bars on the stator segment, renders possible almost complete factory pre-assembly, and thus tested pre-assembly, which reduces the assembly time on the power plant.

By means of the arrangement of the bus bars at the end face of the stator, a compact design of the dynamo-electric machine, in particular of a generator of a wind power plant, can be provided.

This renders possible a compact design of this generator with, at the same time, sufficient ventilation of its winding system and the bus bars.

BRIEF DESCRIPTION OF THE DRAWING

The invention, as well as further advantageous embodiments of the invention, are explained in more detail on the basis of schematically represented exemplary embodiments, in which:
FIG. 1 shows elements of the retaining system,
FIG. 2 shows a perspective representation of bus bars in the retaining system,
FIG. 5 shows a directly driven generator,
FIG. 6 shows a wind power plant.

DETAILED DESCRIPTION OF PREFERRED EMBODIMENTS

Figure 3:
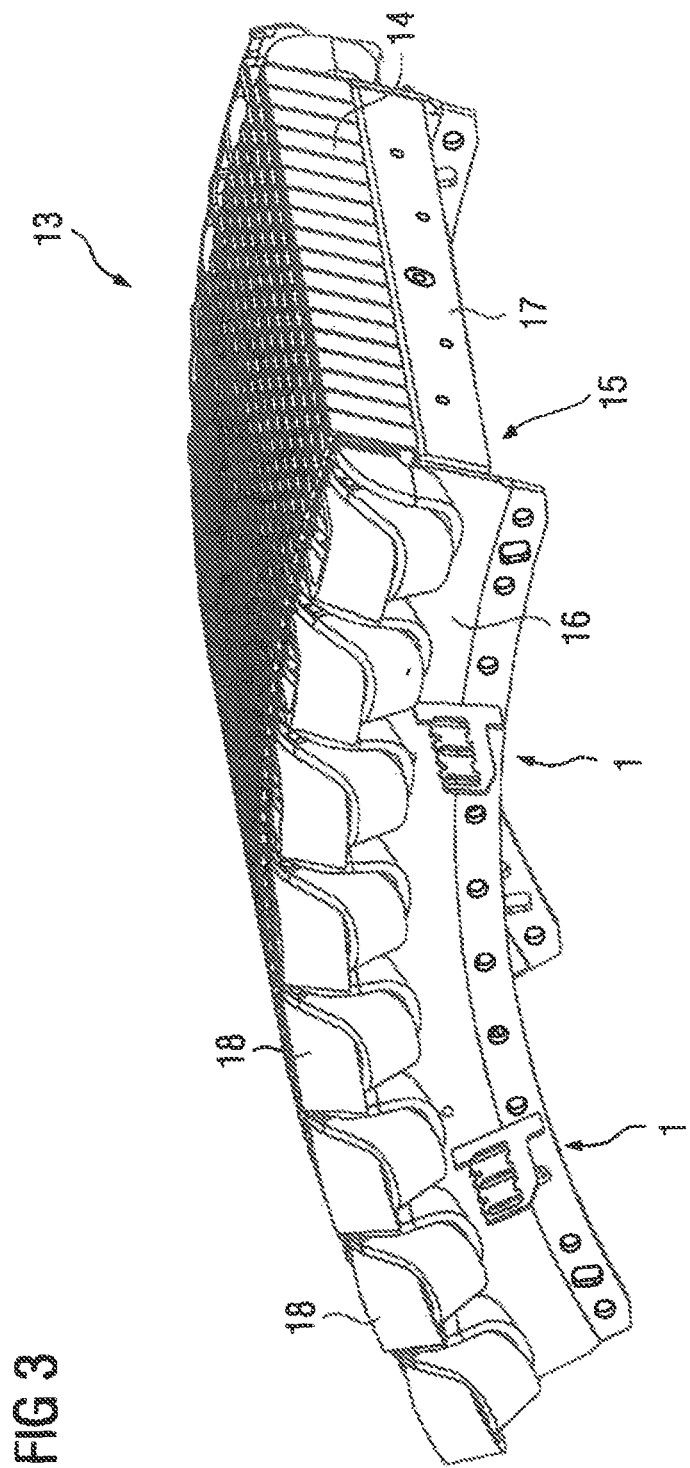
FIG. 3 shows a stator segment.

FIG. 1 shows a retaining system 1 which in essence is composed of a basic element 2 and fixing elements 3 made of steel. These basic elements 2, when installed, are fastened to a pressure plate 16 by means of screw connections 4, The fixing elements 3, when installed, are fastened to the respective basic element 2. The fixing elements 3 have feet 10 to enclose a notch 9 of the basic element 2, an asymmetrically arranged drilled hole 8 ensuring that there is no confusion of the installation position of the fixing elements 3.

When the retaining system 1 is assembled, there are now installation spaces 6 for the bus bars 7, as well as, if necessary, for neutral point connections or earthing cables. When assembled, the retaining system 1 has openings 5. This suppresses eddy currents when the bus bars 7 are energized as there are no closed metallic connections between the individual elements.

FIG. 2 shows a partially perspective representation of the arrangement of the bus bars 7 within the retaining system 1, the retaining system 1 in this case being attached to the pressure plates 16 of a stator 22 or of a stator segment 13. In the region of the basic element 2 and the fixing elements 3, the bus bars 7 have insulation elements 12, which have different thicknesses depending on the voltage applied to them.

FIG. 3 shows an exemplary stator segment 13 in a perspective, but non-scale, representation, with retaining system 1 but without bus bars 7, the laminated core 14 being constructed in the axial direction from partial laminated cores. The laminated core 14 is delimited and fixed in the axial direction by pressure plates 16, with connection elements 17 in this case holding the pressure plates 16 together at the end faces of the stator segment 13, with the pressure plates 16 and the connection elements 17 forming a support system 15. Form-wound coils 18, the winding overhangs of which have different offsets, are arranged in grooves of the laminated core 14, which are not pictured in detail. Electrical energy is now provided to, or drawn off from, these form-wound coils 18. This is effected via the bus bars 7, which are positioned on the retaining system 1, at the end face, in particular on the pressure plates 16.

The bus bars 7 in this case extend over the entire circumferential width of a stator segment 13, thus corresponding approximately to the length of the pressure plate 16. The bus bars 7 may be longer or shorter, depending on the type of connection to the circumferentially adjacent stator segments.

Figure 4:
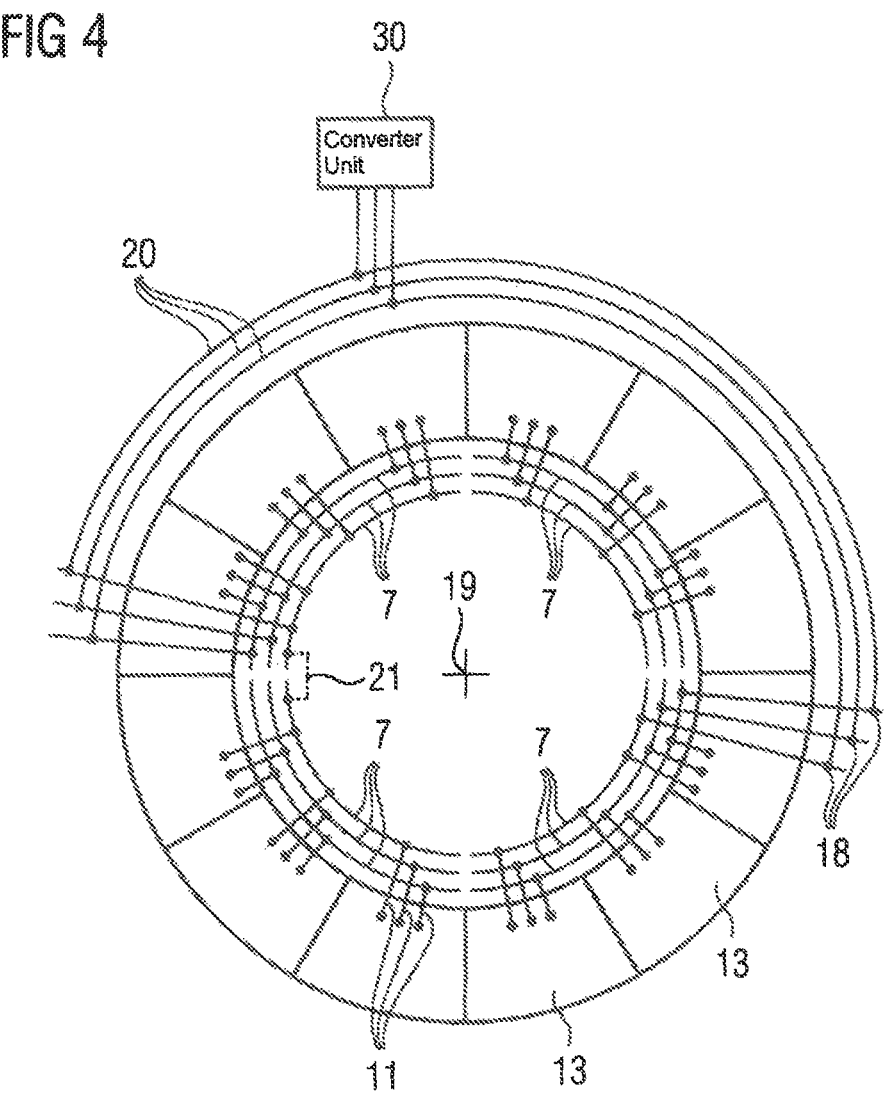
FIG. 4 shows a basic arrangement of stator segments.

FIG. 4 shows a basic representation of a stator 22 constructed from stator segments 13, wherein, of a retaining system 1 that has three bus bars 7, the respective coils 18, or coil groups, of each stator segment 13 are contacted via this bus bar system.

The bus bars 7 in this case are of a curved design, and substantially follow the radius of the stator 22. Each stator segment 13 in this case may have its bus bars 7 already positioned in the retaining system 1. When the stator segments 13 are assembled to form a stator 22, the respective bus bars 7 are also subsequently contacted.

Also possible, however, are respective bus bar sections that extend in the circumferential direction over two, three or more segments. Accordingly, quarter circles or even half circles are possible. The electrical connection lines 20 must be adapted accordingly.

Contact elements 21 effect electrical contacting between bus bar sections of one phase. Such electrical contacting of the bus bar sections in the circumferential direction can be effected by plugging together, welding, stranded wire connections, etc.

The compact structure can be sufficiently cooled by fans, by means of correspondingly guided air flows over, or through, the laminated core 14, as well as in the region of the winding overhangs and the bus bars 7.

FIG. 5 shows a basic arrangement of a directly driven generator 24 of a wind power plant 27, the rotation of the blades 25 driving a rotor 23 which, through electromagnetic interaction with a winding system of the stator 22, generates electrical energy that is made available to a supply grid 26 via a converter unit 30.

Such an arrangement is to be provided, for example, in the case of wind power plants 27 according to FIG. 6, in which there is a generator 24 arranged in a nacelle 29 on a tower 28.

The invention claimed is:

1. A retaining system for bus bars, said retaining system comprising:
   a basic element for fastening to an end face of a stator or stator segment of a dynamoelectric machine, wherein the basic element includes a plurality of notches;
   a plurality of fixing elements configured to fix the bus bars to the basic element, wherein the plurality of fixing elements each Includes feet and a drilled hole;
   a plurality of screws, wherein each one of the plurality of screws fastens each one of the plurality of fixing elements to the basic element via the drilled hole with the feet of each one of the plurality of fixing elements enclosing each one of the plurality of notches of the basic element; and
   a plurality of openings, wherein at least one of the plurality of openings is between each of the plurality of fixing elements and at least another one of the plurality of openings is between one of the fixing elements and the basic element so that there are no closed metallic connections between the plurality of fixing elements and the basic element and eddy currents are suppressed when the bus bars are energized.

2. A stator or stator segment of a dynamoelectric machine, comprising:
   a laminated core having substantially axially extending grooves;
   a winding system received in the grooves and forming winding overhangs at end faces of the laminated core;
   a support system for arrangement of the laminated core, said support system including pressure plates in a region of the end faces and connection elements to fix the pressure plates;
   bus bars; and
   a retaining system for the bus bars, said retaining system including a basic element for fastening to an end face of the laminated core, wherein the basic element includes a plurality of notches; a plurality of fixing elements configured to fix the bus bars to the basic element, wherein the plurality of fixing elements each includes feet and a drilled hole; a plurality of screws, wherein each one of the plurality of screws fastens each one of the plurality of fixing elements to the basic element via the drilled hole with the feet of each one of the plurality of fixing elements enclosing each one of the plurality of notches of the basic element; and a plurality of openings, wherein at least one of the plurality of openings is between each of the plurality of fixing elements and at least another one of the plurality of openings is between one of the fixing elements and the basic element so that there are no closed metallic connections between the plurality of fixing elements and the basic element and eddy currents are suppressed when the bus bars are energized.

3. The stator or stator segment of claim 2, wherein the bus bars extend substantially radially beneath the winding overhangs.

4. The stator or stator segment of claim 2, wherein the basic element of the retaining system is fixed to the pressure plates by screws.

5. The stator or stator segment of claim 2, wherein the bus bars include insulation elements, at least in a region of the basic elements and the fixing elements.

6. A generator of a wind power plant, said generator comprising a stator or stator segment, said stator or stator segment comprising a laminated core having substantially axially extending grooves, a winding system received in the grooves and forming winding overhangs at end faces of the laminated core, a support system for arrangement of the laminated core, said support system including pressure plates in a region of the end faces and connection elements to fix the pressure plates, bus bars, and a retaining system for the bus bars, said retaining system including a basic element for fastening to an end face of the laminated core, wherein the basic element includes a plurality of notches; a plurality of fixing elements configured to fix the bus bars to the basic element, wherein the plurality of fixing elements each includes feet and a drilled hole: a plurality of screws, wherein each one of the plurality of screws fastens each one of the plurality of fixing elements to the basic element via the drilled hole with the feet of each one of the plurality of fixing elements enclosing each one of the plurality of notches of the basic element; and a plurality of openings, wherein at least one of the plurality of openings is between each of the plurality of fixing elements and at least another one of the plurality of openings is between one of the fixing elements and the basic element so that there are no closed metallic connections between the plurality of fixing elements and the basic element and eddy currents are suppressed when the bus bars are energized.

7. The generator of claim 6, wherein the bus bars extend substantially radially beneath the winding overhangs.

8. The generator of claim 6, wherein the basic element of the retaining system is fixed to the pressure plate by screws.

9. The generator of claim 6, wherein the bus bars include insulation elements, at least in a region of the basic elements and the fixing elements.

10. A wind power plant, comprising a generator as set forth in claim 6.

* * * * *